United States Patent [19]
McNeal

[11] Patent Number: 5,735,226
[45] Date of Patent: Apr. 7, 1998

[54] MARINE ANTI-FOULING SYSTEM AND METHOD

[75] Inventor: G. Patrick McNeal, Prescott, Ariz.

[73] Assignee: SGP Technology, Inc., Van Nuys, Calif.

[21] Appl. No.: 643,422

[22] Filed: May 8, 1996

[51] Int. Cl.$^6$ .................................... B63B 59/04
[52] U.S. Cl. .................. 114/222; 114/67 R; 134/1
[58] Field of Search ............... 114/222, 67 R; 367/175; 134/1; 181/140

[56] References Cited

U.S. PATENT DOCUMENTS

| | | | |
|---|---|---|---|
| 2,366,162 | 1/1945 | Vang | 114/67 R |
| 3,318,578 | 5/1967 | Branson | 134/1 |
| 3,625,852 | 12/1971 | Anderson | 204/196 |
| 3,651,352 | 3/1972 | Puskas | 134/1 |
| 3,971,084 | 7/1976 | Spier | 9/6 |
| 4,058,075 | 11/1977 | Piper, Sr. | 114/222 |
| 4,170,185 | 10/1979 | Murphy et al. | 114/222 |
| 4,297,394 | 10/1981 | Wooden et al. | 427/100 |
| 4,444,146 | 4/1984 | De Witz et al. | 114/222 |
| 4,890,567 | 1/1990 | Caduff | 114/222 |
| 4,943,954 | 7/1990 | Ostlie | 367/191 |
| 5,109,174 | 4/1992 | Shewell | 310/317 |
| 5,143,011 | 9/1992 | Rabbette | 114/222 |
| 5,386,397 | 1/1995 | Urroz | 367/139 |
| 5,496,411 | 3/1996 | Candy | 134/1 |
| 5,532,980 | 7/1996 | Zarate et al. | 181/140 |

Primary Examiner—Sherman Basinger
Attorney, Agent, or Firm—Brown, Martin, Haller & McClain

[57] ABSTRACT

A marine anti-fouling system and method for inhibiting the growth of marine life on a submerged surface includes a control box and a number of transducers. The control box further includes a ultrasonic driver board, a magna-polar filter, and a power source. The ultrasonic driver board generates an electrical signal having an ultrasonic frequency which continually varies between 25 KHz to 60 KHz. A portion of this continually varying electrical signal is passed through the magna-polar filter where the signal is enhanced. This enhanced signal is then returned to the ultrasonic driver board where it is combined with the electrical signal varying between 25 KHz and 60 KHz. This combined signal is then electrically communicated to a number of transducers which are mounted on the submerged surface to be protected. There, the electrical signal having combined frequencies is translated from electrical energy to acoustic energy which it transmitted to the submerged surface to inhibit the growth of marine life on the submerged surface.

17 Claims, 3 Drawing Sheets

MARINE ANTI-FOULING SYSTEM AND METHOD

FIELD OF THE INVENTION

The present invention relates generally to a system and method for inhibiting growth of marine life on submerged surfaces which are exposed to seawater. More specifically, the present invention relates to a system and method for inhibiting the growth of marine life using ultrasonic signals.

BACKGROUND OF THE INVENTION

Growth of marine organisms on submerged surfaces has long been a problem. These organisms, including barnacles, mussels, marine worms, corals, anemones, sponges, and algae, attach themselves to any exposed surface of boats, ships, docks and other submerged or partially submerged structures. When these organisms attach themselves to the hulls of ships or boats, their presence hastens the breakdown of the outer finish of the hull as well as detracting from the performance of effected vessel. Another major issue that is created by the unchecked growth of these marine organisms is that vessels traveling significant distances unknowingly transport marine organisms native to one area of the world to other areas, where the native marine life, including vital food sources, might be endangered by the introduction of new species or varieties of organisms.

For boats and ships, probably the most common way of treating the build up of marine organisms, which happens quite rapidly when the vessel is moored or docked, is to have scuba divers scrape the submerged surface, such as the boat hull. Typically, this must be done every three to six weeks, and may be required even more frequently in tropical climates. Even with regular scraping, degradation of the surface of the hull make it is necessary to thoroughly clean and refinish or repaint the hull every few years. In order to accomplish this, the vessel must be removed from the water and placed in dry dock. All of these procedures can become quite costly, and may ultimately result in all but the most avid owners selling his or her boat after realizing that the cost of maintenance is too high.

The scraping and refinishing procedures are often enhanced by utilizing specialized marine paints which kill or repel the organisms, or provide a surface to which the organisms have difficulty firmly attaching. Typically, these paints contained tin or copper. However, as environmental regulations have become increasingly stringent, the use of most of these paints has been or will soon be prohibited. Such prohibition is primarily due to the harm these paints cause to the environment, particularly since their effectiveness arises from their toxicity to marine organisms.

A number of devices and methods have been disclosed in the past as means for addressing the problem of the growth of marine organisms on boat hulls. Many of these devices are intended for use in conjunction with specialized marine paints, and thus, have not been required to rely entirely on their own effectiveness.

U.S. Pat. No. 4,890,567 which issued to Caduff for an invention entitled "Robotic Ultrasonic Cleaning and Spraying Device for Ships' Hulls" teaches an independent ultrasonic cleaning device for use in cleaning the hull exterior of a boat. This device can only be used in dry dock. The cleaning device described in U.S. Pat. No. 4,444,146 which issued to DeWitz et al. entitled "Ultrasonic Subsurface Cleaning" also uses ultrasonic frequencies. The DeWitz device moves along the hull exterior, but may be used while the hull remains in the water. While both of these devices facilitate currently-used methods of hull cleaning, neither one offers a preventive solution.

In U.S. Pat. No. 3,625,852 which issued to Anderson for an invention entitled "Marine Antifouling System," a system is described that uses external electrodes on the hull to produce poisonous chemicals by electrolysis of seawater. However, as previously stated, the practice of poisoning the organisms is not considered environmentally responsible, especially since other marine life may be unintentionally harmed.

U.S. Pat. No. 3,971,084 which issued to Spier for an invention entitled "Hull Construction and Method for Forming Same" discloses a hull manufacturing technique in which wire mesh is embedded in the fiberglass. This wire mesh conducts a sonic signal from the generator to the hull exterior which has metallic plates interspersed on its exterior surface. The sonic signal emanates from each of the metallic plates to provide a plurality of sonic emitters. While this technique may be suitable for new boats, it is highly impractical for existing vessels.

U.S. Pat. No. 4,058,075 which issued to Piper, Sr. for an invention entitled "Marine Life Growth Inhibitor Device" discloses the use of an audible sound vibration to inhibit the growth of marine life on the outer surface of a submerged object. This is achieved by the placement of speakers in the hull below the water line which are electrically driven to create vibrations which are thereby transmitted to the boat's hull. These vibrations, however, are in the audible frequency range which have been found to be substantially ineffective in the inhibition of marine growth.

U.S. Pat. No. 4,170,185 which issued to Murphy et al. for an invention entitled "Preventing Marine Fouling," and U.S. Pat. No. 4,297,394 which issued to Wooden et al. for an invention entitled "Piezoelectric Polymer Antifouling Coating and Method of Use and Application," are similar in their application of a piezofilm to boat hulls. More specifically, both patents disclose the use of a piezofilm which is laminated over a significant portion of the hull's exterior surface and excited by an electrical signal applied through wires connected to the underside of the film. In this manner, virtually the entire surface of the hull can emit a uniform vibrating signal to repel marine organisms. A disadvantage of these methods, however, is that when refinishing of the outer surface of the hull is required, the piezofilm would likely be damaged or destroyed such that it would require complete replacement. Such replacement would, perhaps, be more costly and more time consuming than the periodic hull scrapings and refinishings.

In U.S. Pat. No. 4,943,954 which issued to Ostlie for an invention entitled "Method and a System for Counteracting Marine Biological Fouling of a Hull or a Submerged Construction" describes a system which relies upon low frequency vibration to cause water movement near the hull exterior to inhibit attachment of marine organisms. In order to provide the necessary field of vibration, the transducers must be arranged on the inside of the hull in pairs. These pairs of transducers must be spaced on either side of a nodal line at a pre-determined distance. Such precise placement of the transducers, in many vessels, would be impossible due to the structure of the hull and the placement of bulkheads.

U.S. Pat. No. 5,386,397 which issued to Urroz for an invention entitled "Method and Apparatus for Keeping a Body Surface, Which is in Contact With Water, Free of Fouling" discloses a sound wave generator connected to transducers located at the front and back of the ship's hull to emit a high frequency sound wave train to form a vibrating field encircling the hull. This vibrating field causes a drastic drop in density of the water around the hull which discourages the adhesion of marine organisms to its surface. This method, however, requires that the apparatus be precisely "tuned" in order to propagate a wave train along the surface of the ship's hull. In fact, this "tuning" is so precise that even the material from which the hull is manufactured effects the tuning frequency.

Each of the above-described patents provides means for removing or inhibiting the growth of marine organisms on submerged surfaces such as boat hulls. However, the fact that one or more of these means has not been widely adopted indicates that they are not as effective as would be desirable to effectively eliminate the problems caused by the marine growths. Further, the apparent need to supplement these devices with anti-fouling paints leaves much to be desired. Therefore, the need still exists for an effective, economical device and method for inhibiting the growth of marine organisms which will gain wide acceptance for many marine applications without producing any environmentally harmful results.

SUMMARY OF THE INVENTION

An object of the present invention is to provide a system for use on submerged surfaces, including boat hulls, to inhibit fouling of the submerged surfaces by marine organisms.

Another object of the present invention is to provide a method for extending the maintenance cycles for ship and boat hulls by repelling and/or inhibiting the attachment of marine organisms to the hull which expedite the breakdown of the surface finish.

Yet another object of the present invention is to provide an electronic filter for converting ultrasonic frequencies into a blend of sonic, ultrasonic and subatomic frequencies for repelling marine organisms.

In an exemplary embodiment, the marine anti-fouling system of the present invention includes an ultrasonic driver board that produces an electrical signal having a continuously varying ultrasonic frequency in the 25 KHz to 60 KHz range. This continuously varying electrical signal is passed through a magna-polar filter. Specifically, this magna-polar filter includes a housing which contains an input piezoelectric transducer, a collector grid, and a copper loop between them. The piezoelectric transducer creates an acoustic signal of the same frequency as the electrical signal. Once created, the acoustic signal from the input piezoelectric transducer passes through the copper loop which is inductively coupled to a pair of diametrically opposed like-poled neodymium magnets. This induction causes an electromagnetic field to be generated around the copper loop. As a result of this field, the acoustic signal which passes through the loop becomes enhanced. More specifically, the acoustic signal becomes molecularly and subatomically polarized as it passes through the loop. This polarization modifies the acoustic signal to include frequencies within the sub-atomic frequency range. Once the acoustic signal has been enhanced, the electromagnetic components of the signal are collected by the collector grid. An output wire attaches to the collector grid to conduct the electrical signal having enhanced frequencies back to the ultrasonic driver board for transmission to one or more output transducers. The ultrasonic driver board combines the electrical signal having enhanced frequencies to the electrical signal having conventional 25 KHz to 60 KHz range frequencies. This combined electrical signal is then electrically transmitted to each output transducer which is attached to the interior surface of the boat hull or other surface to be protected.

The input piezoelectric transducer, copper loop and collector grid are contained within a housing, with the neodymium magnets disposed on opposite facing sides of the housing so that the north pole of each magnetic is immediately adjacent the outer surface of the housing. The electrical signals entering and leaving the filter housing are transmitted along input wires and an output wire. These wires may be easily sealed into the housing wall making the filter housing water-tight. Such water-tightness is an important feature when placing the system in the hull of a boat below the waterline or in some other application where the system cannot be maintained in an entirely dry location.

The inventive method is practiced by providing a driver boards with an integral filter, and a plurality of output transducers in a distribution around the surface to be protected. Such distribution depends upon the shape and structure of the surface. For boat and ship hulls, the transducers may be placed in a ring around the interior of the hull below the waterline, with additional placements at, for example, the keel of a sailboat.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENT

Figure 1:
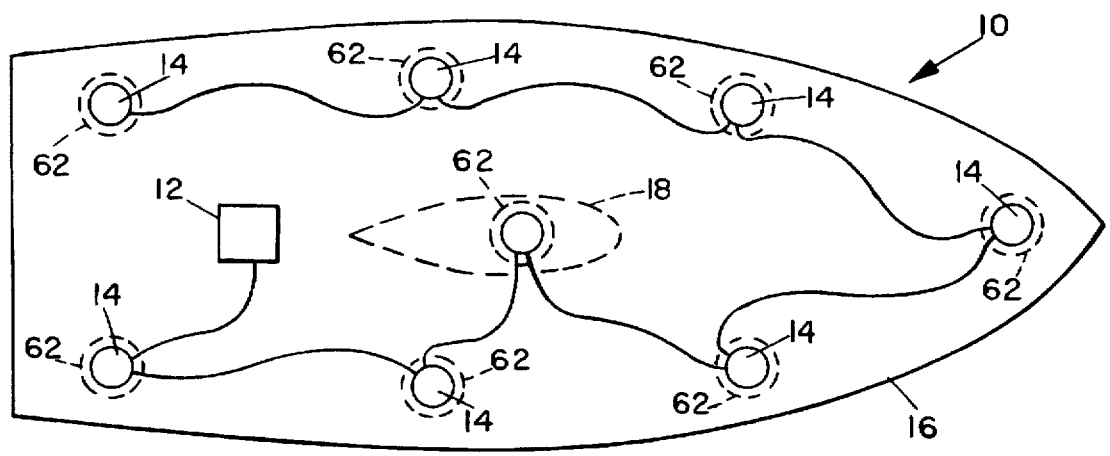
FIG. 1 is a diagrammatic view of the system of the present invention showing the control box and transducers mounted within the hull of a boat.

As illustrated in FIG. 1, the system of the present invention is shown and generally designated 10. The system of the present invention includes a control box 12 and a number of transducers 14 which are distributed around the submerged surface to be protected from fouling. In FIG. 1, for example, the transducers 14 are distributed around the interior surface of a hull 16 and positioned slightly below the water line. It should be appreciated that any number of transducers 14 may be used in cooperation with a single control box 12. As a result, surfaces having a variety of surface areas may be protected from fouling with a single control box. Moreover, any area requiring more concentrated protection may have more than one transducer 14 mounted adjacent to it. A keel 18 on a sail boat, for example, which is otherwise prone to fouling, would benefit from the placement of one or more transducers 14 onto the hull 16 adjacent the keel, or the transducers 14 may be attached directly to the mounting bolts which attach the keel to the hull.

Figure 2:
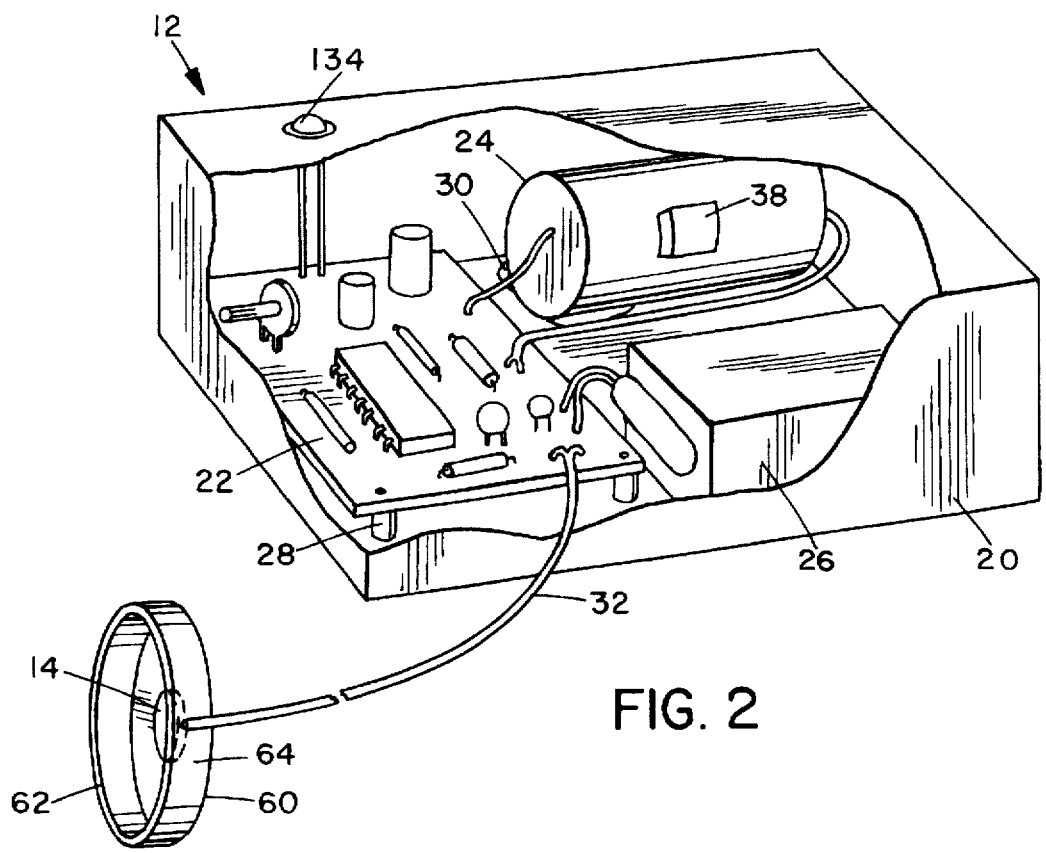
FIG. 2 is a diagrammatic view of the control box with portions cut away to show the positioning of the ultrasonic driver board, magna-polar filter, and battery.

Referring now to FIG. 2, the control box 12 is shown with portions of the case 20 removed for clarity. As shown, the control box 12 consists of a case 20 which contains an ultrasonic driver board 22, a magna-polar filter 24, and a battery 26. The ultrasonic driver board 22 is shown mounted to the case 20 of the control box 12 with a number of standoffs 28. These standoffs 28 extend between the case 20 and the ultrasonic driver board 22 and are attached with screws. The magna-polar filter 24, as well as the battery 26, may be mounted within the case 20 using an epoxy 30. These mounting techniques, however, are merely exemplary of the preferred embodiment and any other technique for retaining the ultrasonic driver board 22, magna-polar filter 24, and battery 26, may be used.

Figure 3:
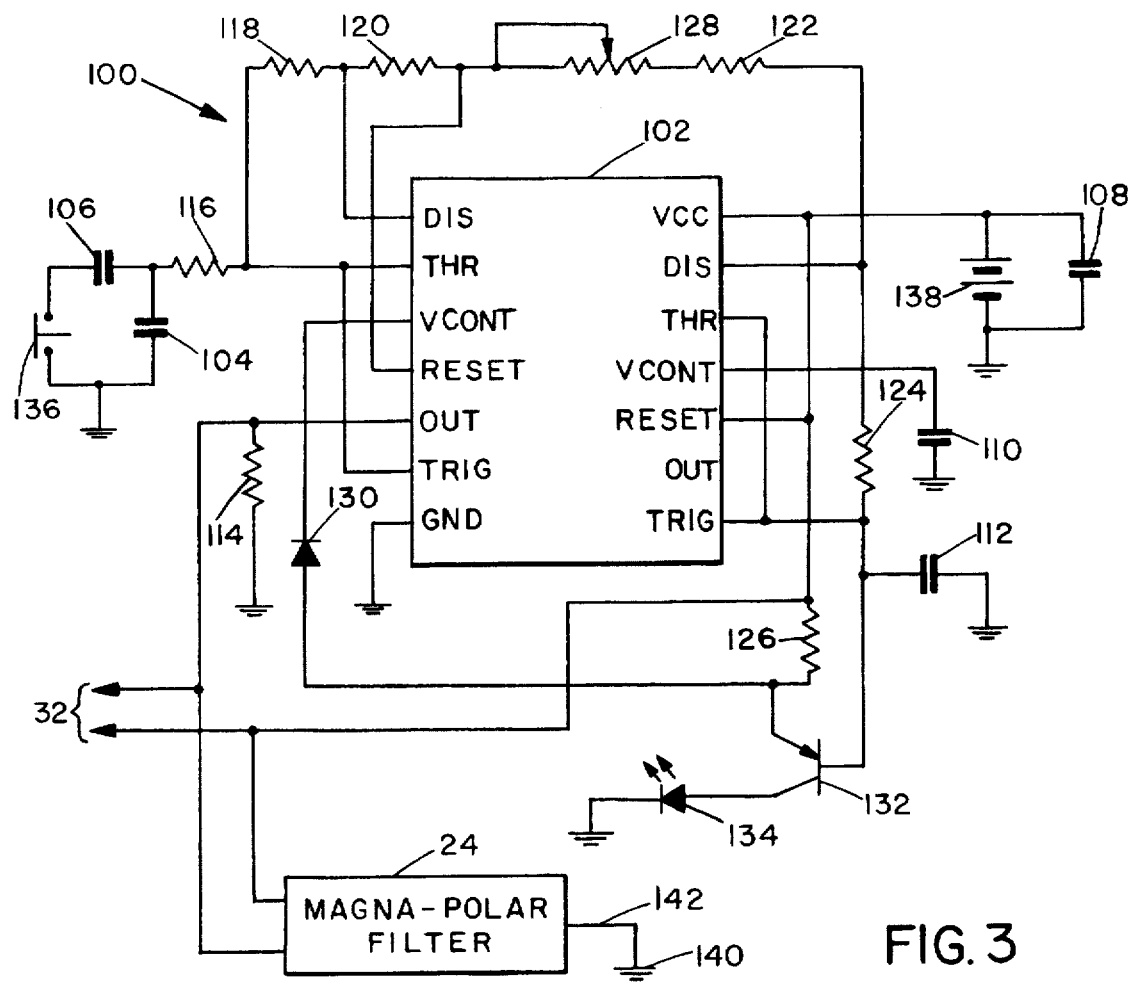
FIG. 3 is a circuit diagram of the ultrasonic driver board.

Referring now to FIG. 3, the circuit diagram for the ultrasonic driver board 22 is shown and generally designated 100. The circuit 100 embodied on the ultrasonic driver board 22 incorporates the readily available discrete components 104–138 and integrated circuit 102 which are listed below in Table 1.

TABLE 1

| REFERENCE NO. | DEVICE | DESCRIPTION |
| --- | --- | --- |
| 102 | IC | Integrated Circuit — GLC556900 |
| 104 | $C_1$ | Capacitor — 104Z-45 V |
| 106 | $C_2$ | Capacitor — 682 |
| 108 | $C_3$ | Capacitor — 100 µF, 16 V |
| 110 | $C_4$ | Capacitor — 103 |
| 112 | $C_5$ | Capacitor — 10 µF, 25 V |
| 114 | $R_1$ | Resistor — 100Ω |
| 116 | $R_2$ | Resistor — 0.001KΩ |
| 118 | $R_3$ | Resistor — 15KΩ |
| 120 | $R_4$ | Resistor — 18KΩ |
| 122 | $R_5$ | Resistor — 2.2KΩ |
| 124 | $R_6$ | Resistor — 4.7KΩ |
| 126 | $R_7$ | Resistor — 1KΩ |
| 128 | $VR_1$ | Variable Resistor — 250K |
| 130 | $D_1$ | Diode — 1N4001 |
| 132 | $T_1$ | Transistor — A1015 GR9J |
| 134 | $L_1$ | LED |
| 136 | $SW_1$ | Switch — momentary |
| 138 | $B_1$ | Battery — 9 VDC |

The ultrasonic driver board 22 consumes approximately 1.5 watts and generates an electrical signal having a primary frequency which continuously varies in the range of 24 KHz to 65 KHz. Referring now to schematic 100, the generation of the electrical signal begins with the IC 102. The IC 102 is a standard 556 timer which is configured to operate in an astable mode thereby generating an output signal which oscillates. Configuring of the IC 102 is accomplished by selecting resistors 114–126 and capacitors 104–112 having particular values to create the oscillations within a specific frequency range. It should be noted, however, that while the preferred embodiment of the present invention incorporates an IC 102 configured to oscillate within a particular frequency range, any number of other devices may be used to generate the particular frequencies. Such other devices, for example, could include a microprocessor, microcontroller, or other programmable devices, as well as discrete semiconductors.

The frequency of the output from the IC 102 varies between 24 KHz and 60 KHz. Importantly, the frequency of this output signal continually sweeps from 24 KHz to 60 KHz and back to 24 KHz. The period of this sweep from 24 KHz to 60 KHz is approximately 280 microseconds. Thus, over a relatively short period of time, every frequency between 24 KHz and 60 KHz will have been generated. Due to the tolerances of the various components, the variable resistor 128 may be adjusted in order to set the precise frequency range of the output signal.

Once generated by the IC 102, a portion of the output signal is fed to the magna-polar filter 24. As will be more thoroughly discussed in conjunction with FIG. 4, the magna-polar filter 24 receives an input signal from the control box output wire 32, and in turn generates an electrical signal having enhanced frequencies in the sub-atomic frequency range. This signal having enhanced frequencies is then electrically connected to the circuit ground 140 of the ultrasonic driver board 22 via the filter output wire 142. While it would appear that such a connection to circuit ground 140 would vitiate any benefit created by the magna-polar filter 24, such is not the case. On the contrary, by using a portion of the output signal to generate an electrical signal having enhanced frequencies, and returning that signal to the ground circuit, a benefit is conferred to the circuitry as a whole. More specifically, the frequencies which are present in the electrical signal are such that when the output signal is fed to transducers 14 which are attached to a submerged surface, the fouling of the surface is impeded. In fact, such impediment to fouling is significantly greater than if there were no magna-polar filter 24 employed in the circuit.

The other portion of the output signal on the control box output wire 32 is fed to a plurality of piezoelectric transducers 14. These transducers 14, as used in the preferred embodiment, are physically attached to the inside surface of the hull 16, positioned just below the waterline. As generally appreciated from FIG. 1, the control box 12 is electrically connected to each of the transducers with a control box output wire 32. This wire 32 has two electrical conductors which connect each hull mounted transducer 14 in parallel with the control box 12. In other words, one electrical conductor is considered the positive conductor, and the other electrical conductor is considered the negative conductor, with each transducer 14 being electrically connected between the two conductors. Such connection insures that if one transducer 14 fails, the remaining transducers 14 will still continue to receive the electrical signal. Also generally shown in FIG. 1, the control box 12 is typically mounted sufficiently close to the surface to be protected in order to minimize the lengths of wire 32.

The circuit of the preferred embodiment as shown in FIG. 3 is powered by an internal battery 26. Typically, the battery 26 must provide 9 Volts of direct current (D.C.), such as a standard transistor radio battery. It is to be appreciated, however, that internal battery power is only one possible source of power, and that the system 10 could be powered by either an external alternating current (AC) source and a regulated transformer, or from an external battery.

Because the electrical and acoustic signals generated by the system are in the ultrasonic frequency range, it is difficult for an operator to verify the correct operation of the system. Consequently, a switch 136 is utilized to temporarily connect capacitor 106 into the circuit. This temporary connection of capacitor 106 lowers the frequency of the electrical signal being generated into the audible frequency range. Thus, the operator may, by momentarily pressing the switch, audibly test the operation of the system 10. In addition to the momentary switch 136, a LED 134 is attached to the circuit such that the LED 134 lights when the ultrasonic driver board is functioning. As a result, the operator of the system may verify the proper operation of the system 10 simply by viewing the LED 134.

Figure 4:
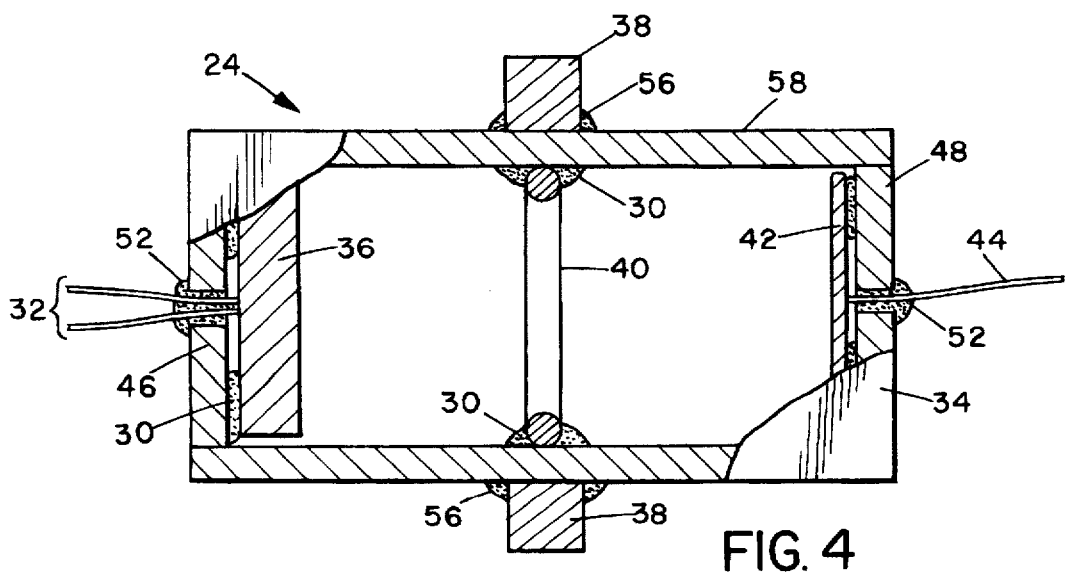
FIG. 4 is a diagrammatic view of the magna-polar filter with portions cut away showing the input transducer, opposing like-poled magnets, conductive loop, and collector grid.

The magna-polar filter 24, which is more clearly shown in FIG. 4, consists of a housing 34, an input transducer 36, a pair of neodymium magnets 38, a conductive loop 40, a collector grid 42, and an output wire 44. The housing 34 is cylindrically shaped and is made from polyvinylchloride (PVC), or a similar plastic or polymer. Use of this material facilitates making the housing 34 at least water-resistant, and preferably, water-tight. Such water-tightness is particularly desirable where the system 10 will be exposed to high humidity, such as in most marine environments. The dimensions of the housing 34 are typically on the order of 1" (25.4 mm) diameter and length, so commercially available PVC pipe is appropriate. For larger filters, larger diameter PVC pipe is readily available. The use of such pipe, however, should not be construed as a limitation of the housing sizes.

The input end cap 46 and the output end cap 48 of the housing 34 are substantially flat and may also be made from PVC, or a similar plastic or polymer. As an alternative to a flat end cap, a commercially available PVC pipe cap may be used. These caps, like the flat end caps 46,48, would provide a water-tight seal, while simplifying the construction of the housing. Both the flat end cap and the PVC pipe cap may be sealed against the housing 34 using any suitable adhesive or epoxy known in the art.

Passing through the input end cap 46 is the control box output wire 32 which provides the electrical connection between the ultrasonic driver board and the input transducer 36 within the magna-polar filter 24. In order to maintain the water-tight seal created by sealing the input end cap 46 and the housing 34, a sealant 52 may be applied to the wires 32 as they pass through the end cap 46. Such a sealant 52 may include an epoxy, adhesive, silicone sealant, or any other material which would exhibit satisfactory sealing characteristics.

The input transducer 36 has a diameter to closely fit the inner diameter of the housing 34, e.g., ¾" (19 mm) for 1¼" O.D./¾" I.D. pipe. Such transducers 36 are commercially available from Radio Shack, or other electronics parts suppliers that carry similar transducers to Radio Shack Part No. 273-073, 30V$_{p-p}$max. While the preferred embodiment incorporates this particular transducer 36, it is to be appreciated that any transducer having a suitable frequency range and output sound pressure may be used. The input transducer 36 is attached to the inside surface of the input end cap 46 by epoxy 30 or other suitable adhesive. Thus, once mounted onto the input end of the housing, the input transducer 36 is sealed within the housing 34 where it is protected from moisture.

The conductive loop 40 is located approximately halfway along the length of the housing 34, and is formed by a single loop of 2 to 28 AWG gauge copper wire. This copper wire is bent into a circular loop and the two ends of the wire are soldered together creating a copper loop which is a continuous circular conductor. This conductive loop 40 is affixed in place against the inside surface of the housing using an epoxy, or other suitable adhesive. Importantly, the orientation of the conductive loop 40 is such that the loop defines a plane which is perpendicular to the longitudinal axis of the housing 34. This is so to insure that any acoustic or electromagnetic signals passing through the housing 34 will necessarily pass through the conductive loop.

On the outer surface of the housing 34, at locations adjacent to the placement of the conductive loop 40, two neodymium magnets 38 are attached using an adhesive 56. These magnets 38 are positioned on the housing 34 diametrically opposite each other so that their north poles are adjacent the outer surface 58 of the housing 34. The location of the magnets 38 are such that they inductively couple to the conductive loop 40. This inductive coupling induces both magnetic and electric fields in the conductive loop 40 which in turn modifies the ultrasonic waves passing through the loop. As the ultrasonic frequencies generated by the input transducer 36 propagate through the magna-polar filter 24, the signal is polarized and an infinite number of harmonics are generated. More specifically, these harmonics are produced by a phenomenon where the ultrasonic signals are molecularly and subatomically polarized by passing between the like-poled magnets 38, and positively charged by the electric and magnetic fields induced in the conductive loop 40. Thus, once the ultrasonic acoustic signal is generated and passes through the conductive loop 40, the acoustic signal is enhanced to include a variety of other signals having a variety of frequencies. These frequencies are considered to be "sub-atomic." To provide additional clarification of the subatomic frequencies generated by the magna-polar filter, the term "subatomic frequency" refers to a form of energy that is smaller or finer than an atom and seeming to have a resonance which, when taken to an even finer level, appears to be measurable and definable as very specific frequencies that can be measured or produced in numerical or alphabetical format which can be read and generated by a spectrum analyzer and computer, respectively.

The acoustic signal, comprising both the original frequencies, and the enhanced frequencies, passes through the conductive loop 40 and is collected by the collector grid 42. This collector grid 42 is made of a fine mesh brass screen having a diameter to approximately match the inner diameter of the housing 34. As shown in FIG. 4, the collector grid 42 is positioned against the inside surface of the output end cap 48 and held in position with epoxy 30. However, any other suitable adhesive may be used to retain the collector grid 42 in position.

The filter output wire 44 is soldered or otherwise attached to the collector grid 42 to conduct the enhanced frequencies collected by the collector grid, through output end cap 48 of the housing 34, and back to the ultrasonic driver board 22 as discussed in connection with FIG. 3. The filter output wire 44 is typically on the order of 26–28 gauge wire. Like the input wire 32, the filter output wire 44 may be sealed as it passes through the output end cap 48 with any sealing material as discussed above.

The method of the present invention for inhibiting the growth of marine life on submerged surfaces using ultrasonic signals includes the steps of locating a control box 12 near the submerged surface to be protected, placing at least one ultrasonic transducer 14 along the surface to be protected, and attaching the control box output wire 32 between the control box 12, and each of the transducers 14.

Referring back to FIG. 1, the method of the preferred embodiment includes mounting the control box 12 within the hull 16 of the sail boat in such a manner as to minimize its exposure to moisture. It is to be appreciated, however, if such positioning is not practical, the case of the control box 12 may be constructed to be water-tight. In any event, it is desirable to position the control box 12 in a location which is accessible by the operator of the vessel to facilitate replacement of battery 26 and to allow easy verification of operation of the system 10.

Mounting of the transducers 14 to the hull 16 of the sail boat requires a variety of techniques. In a first method for mounting the hull transducer 14, a transducer 14 may be mounted within a sealed case (not shown) which would provide a resonance chamber. The transducers 14 will generate a ultrasonic frequency acoustic signal which resonates within the resonance chamber. This resonating ultrasonic frequency then creates vibrations of the sealed case which, because the sealed case is securely mounted to the hull 16, is communicated to the hull. This method may be preferred in an environment in which there is a likelihood of water or moisture coming in contact with the transducer.

In a second method of mounting the hull transducer 14, the transducer may be placed within a resonance chamber like the first embodiment. This chamber, however, is not sealed and is, instead, mounted against the hull 16 of the boat such that the opening of the chamber is positioned towards the hull 16, as described above for transducer cap 60. This positioning allows the acoustic signals from the transducer 14 to directly strike the inside surface of the hull 16, with the inside of the hull providing the sealing surface. Elimination of the facing wall in front of the transducer permits a higher level of the acoustic signal to be delivered to the hull 16 compared with the pre-sealed chamber. In environments where moisture intrusion is likely, a complete waterproof seal between the chamber and the hull should be provided. Such a seal can be attained using known silicone sealants or epoxies.

As an example of the latter method of encasing the transducers, as illustrated in FIG. 2, control box output wire 32 connects to the transducer 14 through the sidewall 64 of transducer cap 60, which provides a sealed case once affixed to the surface to be protected. Transducer 14 is attached at the center of the inside surface of the transducer cap 60 by epoxy or other appropriate attachment means. To affix the transducer to the surface to be protected, the rim 62 of transducer cap 60 is coated with an appropriate adhesive such as epoxy or silicone sealant such as to provide a water-tight seal, then placed so that the transducer within the cap faces toward the surface at the desired mounting location. The transducer cap provides protection for the transducer 14 as well as holding it in place. Since the sealed chamber acts as a resonance chamber, different size caps may produce slightly different results. Transducer caps 60 can be made from polystyrene, PVC or polypropylene, or like materials, and may range in from diameter from just large enough to retain the transducer 14, e.g., approximately 1.5 inches, to 4.5 inches. The height of the transducer cap 60 is typically less than 1.5 inches. In the tests that are described below, transducer cap sizes, i.e., chamber sizes, were changed to address localized increased growth on, for example, the rudders and propellers, by decreasing the cap height from 1.5 inches to 0.75 inch. This placed the transducer 14 closer to the hull and decreased the chamber volume.

The control box output wire 32 as shown in FIG. 1, and as briefly discussed in conjunction with FIG. 3, connects the control box 12 to the transducers 14. This output wire, which has two conductors as discussed above, must enter and exit the transducer cases. As a result, it is necessary to apply a sealant to the sealed case at each location where the control box output wire 32 enters and exits the case. Although effective to prevent water damage to the transducer 14, such a method of electrical connection is cumbersome and somewhat tedious.

As an alternative to wiring the control box output wire 32 directly to each transducer 14, it is possible to preform each transducer and case with a two conductor pigtail. This pigtail would allow the mounting of the transducer 14 without concern for passing the wires 32 through the sealed case. In such a situation which incorporates pigtails, it would be possible to merely twist the electrical conductors of the pigtail and control box output wire 32 together and seal the connection with a suitable electrical cap. The use of pigtails greatly simplifies the mounting and wiring of the transducers 14 and control box 12 of the present invention.

In order to insure that an acoustic signal having a sufficient strength is delivered to the entire surface to be protected, it is important to place the transducers 14 close enough together. Typically, transducers 14 will cover an area having a radius ranging from approximately eight to ten feet. In other words, the transducers 14 must be spaced within eight to ten feet of each other to adequately protect the submerged surface of the hull 16. In some circumstances, it may be necessary to provide an increased signal to certain areas of the submerged surface which are particularly prone to fouling. On the sailboat incorporating the preferred embodiment, such area would include the keel 18. A keel, which extends perpendicularly from the bottom of the hull, would typically require a transducer 14 to be placed immediately adjacent the area where the keel attaches to the hull. The ultrasonic signal strength on the keel may be even further enhanced by placing a transducer 14 against one or more of the mounting bolts for the keel.

Tests were conducted using the inventive marine anti-fouling system on three different boats in Key West, Fla., and were compared to a submerged control panel located nearby the test boats. The control panel consisted of a sheet of plywood coated with two coats of polyurethane which had no anti-fouling properties. Each of the boat hulls was cleaned by a diver prior to initiation of the test.

Figure 5:
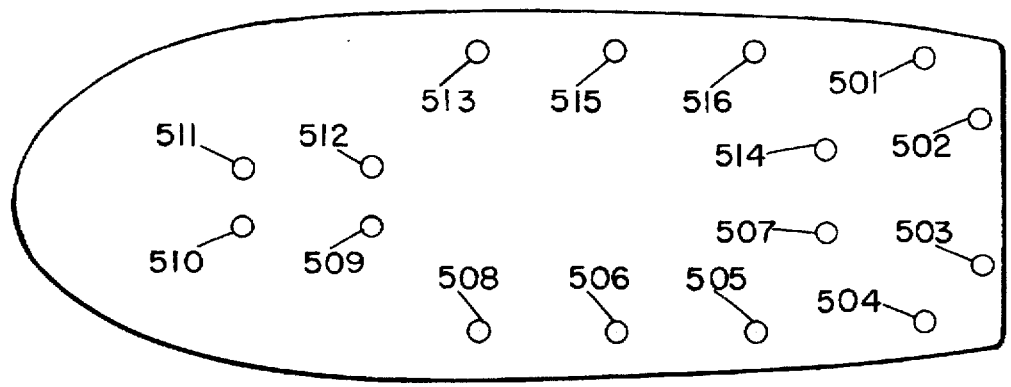
FIG. 5 is a diagrammatic view of the transducer mounting pattern for a first test boat.

Test #1:

Description: 41 foot fiberglass power boat.
Transducer layout: FIG. 5 (Transducers 500–516)
Date: Dec. 15, 1995: Hull cleaned, system installed.
January 10, 1996: No visible changes.
March 28, 1996: Light algae growth; a few tube worms visible on locations corresponding to 502 and 503 (rudders); tube worm buds and a few tube worms on locations corresponding to 507 and 514 (propellers).
April 12, 1996: Light algae growth; additional tube worm growth at 502, 503, 507 and 514.
Comments: The boat showed no hard growth except at the propeller and rudder locations. Transducers with shorter cap heights (.75" in place of original 1.5") were substituted at locations 502, 503, 507 and 514.

Figure 6:
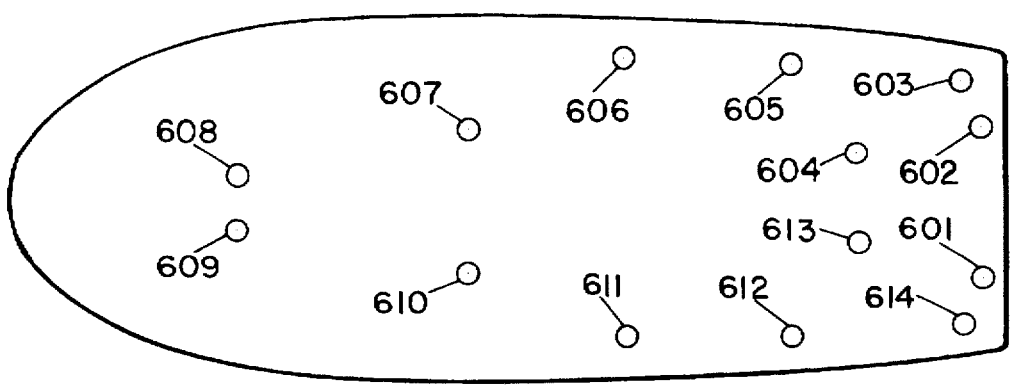
FIG. 6 is a diagrammatic view of the transducer mounting pattern for a second test boat.

Test #2:

Description: 28 foot fiberglass power boat.
Transducer layout: FIG. 6 (Transducers 600–614)
Date: Dec. 15, 1995: Hull cleaned, system installed.
January 10, 1996: Some spots show algae growth; a few tube worm buds at locations corresponding to 604 and 613 (propeller).
March 28, 1996: a few tube worms visible on locations corresponding to 604 and 613.
April 12, 1996: Light algae growth; additional tube worm growth at 604 and 613.
Comments: The boat showed no hard growth except at the propeller and rudder locations. Transducers with shorter cap heights (.75" in place of original 1.5") were substituted at locations 602, 603, 607 and 614.

Figure 7:
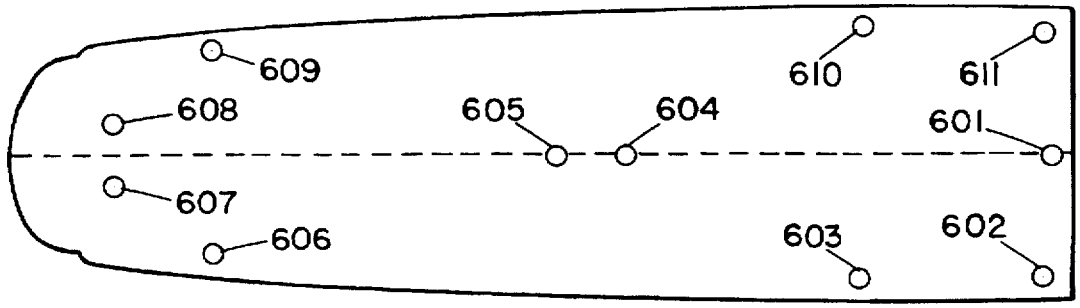
FIG. 7 is a diagrammatic view of the transducer mounting pattern for a third test boat.

Test #3:

Description: 34 foot fiberglass houseboat.
Transducer layout: FIG. 7 (Transducers 700–711)
Date: Dec. 15, 1995: Hull cleaned, system installed.
January 10, 1996: Location corresponding to 701 (outdrive)

|                 | shows heavy algae.                                                                                                          |
| --------------- | --------------------------------------------------------------------------------------------------------------------------- |
| March 28, 1996: | Light to medium algae growth appearing; a few tube worms visible on locations corresponding to 701.                         |
| April 12, 1996: | Medium to heavy algae growth; additional tube worm growth and buds at most locations.                                       |

Comments: The anti-fouling system experienced a failure in mid-January. The unit was not replaced until approximately February 9, 1996. Hard growth appearing on the boat most likely attached itself during period that unit was not operating. Results supported previous findings that the inventive system will not prevent growth from maturing once it has already attached to the hull.

Control:

Description: 4' × 8' sheet of plywood with two coats of polyurethane.
Transducer layout: none

| Date:             |                                                                                           |
| ----------------- | ----------------------------------------------------------------------------------------- |
| January 10, 1996: | Heavy algae growth; a few tube worms and tube worm buds over entire surface.              |
| March 28, 1996:   | Medium algae growth; a few tube worm buds over entire surface.                            |
| April 12, 1996:   | Heavy algae growth; additional tube worm growth and buds at most locations; a few barnacles. |

In a second embodiment, the system of the present invention may be used to prevent the fouling of a variety of submerged surfaces. Such surfaces could include, for example, water inlet grates of power plants, or any other submerged surface where the growth of marine life is undesirable. It is to be appreciated that, regardless of the size of the submerged surface or its depth from the surface of the water, the system of the present invention will inhibit the growth of marine life on the submerged surface.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A system for inhibiting growth of marine organisms on a submerged surface comprising:

a driver board, said driver board having an electrical signal output;

a magna-polar filter, said magna-polar filter having an electrical signal input and an electrical transducer output, said electrical signal input of said magna-polar filter being in electrical connection with said electrical signal output of said driver board, wherein said filter receives said electrical signal output from said driver board and generates an electrical signal having enhanced frequencies, said electrical signal having enhanced frequencies being electrically communicated to said driver board thereby enhancing said electrical signal output to an electrical signal output having enhanced frequencies;

a plurality of transducers, each said transducer having an electrical input, each said electrical input being electrically connected to said electrical signal output of said driver board to receive said electrical signal output having enhanced frequencies, each said transducer converts said electrical signal having enhanced frequencies to a first acoustic signal; and wherein said transducers are firmly attached to said submerged surface to communicate said first acoustic signal to said submerged surface to inhibit growth of said marine organisms on said submerged surface.

2. A system as in claim 1 wherein said driver board further comprises:

a microcircuit, and a plurality of passive components, said passive components configured with said microcircuit to generate said electrical signal output.

3. A system as in claim 2 wherein said electrical signal output having a continuously varying frequency varies between 25 KHz and 60 KHz.

4. A system as in claim 2 wherein said microcircuit is a dual timer microcircuit.

5. A system as in claim 2 wherein said microcircuit is a microprocessor microcircuit.

6. A system as in claim 1 wherein said magna-polar filter further comprises:

an elongated housing, said housing having a first end, a second end, and an outer surface, said housing being formed with a resonance chamber;

an input transducer, said input transducer being disposed within said resonance chamber and against said first end of said housing, said input transducer being electrically connected to said electrical signal input, wherein said input transducer converts said electrical signal input to a second acoustic signal;

a collector grid, said collector grid being disposed within said resonance chamber and against said second end of said housing, said collector grid being in electrical connection with said electrical transducer output;

a conductive loop, said conductive loop being disposed within said resonance chamber between said input transducer and said collector grid;

a pair of magnets, each said magnet having a north pole and a south pole which create a magnetic field, said north pole of each said magnet being diametrically opposed against said outside surface of said housing such that said conductive loop is subjected to said magnetic field of each said magnet; and wherein said second acoustic signal propagates from said input transducer to said collector grid passing through said conductive loop wherein said internal acoustic signal acquires enhanced frequencies.

7. A system as in claim 6 wherein said housing is made from a non-ferrous material.

8. A system as in claim 6 wherein said housing is made from polyvinylchloride (PVC) pipe.

9. A system as in claim 6 wherein said collector grid is formed from a fine brass screen.

10. A system as in claim 6 wherein said conductive loop is made of copper.

11. A system as in claim 6 wherein each said magnet is a neodymium magnet.

12. A system for inhibiting growth of marine organisms on a submerged surface comprising:

a driver board, said driver board having an electrical signal output;

a filter means, said filter means having an electrical signal input and an electrical transducer output, said electrical signal input of each said filter being in electrical connection with said electrical signal output of said driver board, said filter means generating an electrical signal having enhanced frequencies, said electrical signal having enhanced frequencies being electrically communicated to said driver board thereby enhancing said electrical signal output to an electrical signal output having enhanced frequencies;

a plurality of transducers, each said transducer having an electrical input, each said electrical input being electrically connected to said electrical signal output of said driver board to receive said electrical signal having enhanced frequencies, wherein each said transducer converts said electrical signal having enhanced frequencies to an acoustic signal; and a means for attaching each said transducer to said submerged surface to communicate said first acoustic signal to said submerged surface to inhibit growth of said marine organisms on said submerged surface.

13. A system as in claim 12 wherein said filter means further comprises:

an elongated housing, said housing having a first end, a second end, and an outer surface, said housing being formed with a resonance chamber;

an input transducer, said input transducer being disposed within said resonance chamber and against said first end of said housing, said input transducer being electrically connected to said electrical signal input, wherein said input transducer converts said electrical signal input to a second acoustic signal;

a collector grid, said collector grid being disposed within said resonance chamber and against said second end of said housing, said collector grid being in electrical connection with said electrical transducer output;

a conductive loop, said conductive loop being disposed within said resonance chamber between said input transducer and said collector grid;

a pair of magnets, each said magnet having a north pole and a south pole which create a magnetic field, said north pole of each said magnet being diametrically opposed against said outside surface of said housing such that said conductive loop is subjected to said magnetic field of each said magnet; and wherein said second acoustic signal propagates from said input transducer to said collector grid passing through said conductive loop wherein said internal acoustic signal acquires enhanced frequencies.

14. A system as in claim 12, further comprising:

a case, said case having an interior face and at least one sidewall extending perpendicular to said interior face so that said case is at least partially enclosed to form a resonance chamber, wherein said transducer is mounted on said interior face;

an adhesive sealant for application to an edge of said at least one sidewall for adhering said case to a selected area of said submerged surface so that said transducer is directed toward said selected area of said submerged surface.

15. A method for inhibiting the growth of organisms on a submerged surface located within a marine environment, the method comprising:

providing an ultrasonic driver board for generating a driving signal;

providing a power source for powering said ultrasonic driver;

providing a magna-polar filter for receiving a portion of said driving signal and generating an electrical signal having enhanced frequencies;

connecting an output of said magna-polar filter to a ground circuit of said driver board and conducting said electrical signal having enhanced frequencies to said driver board whereby said driving signal is enhanced;

positioning an ultrasonic transducer at at least one selected location on said submerged surface, said ultrasonic transducer having a radius of coverage; and connecting an output of the driver board to said ultrasonic transducer so that said enhanced driving signal drives said ultrasonic transducer.

16. The method of claim 15, wherein said at least one selected location comprises a plurality of selected locations, and the step of positioning comprises selecting adjacent locations of said plurality of selected locations so that, for a corresponding plurality of said ultrasonic transducers, the radii of coverage at least partially overlap to substantially cover said submerged surface.

17. The method of claim 15, wherein the step of providing a magna-polar filter includes the steps of:

providing an elongated housing having a first end, a second end, and an outer surface;

disposing an input transducer adjacent said first end of said housing, said input transducer having an input for receiving said driver signal, said input transducer converting said driver signal to an acoustic signal;

disposing a collector grid adjacent said second end of said housing, said collector grid being in electrical connection with said magna-polar filter output;

disposing a conductive loop between said input transducer and said collector grid; and disposing a pair of magnets on diametrically opposite positions of said outer surface of said housing in magnetic communication with said conductive loop, each said magnet having a north pole and a south pole which create a magnetic field, said pair of magnets being oriented so that said north pole of each said magnet is adjacent said outer surface;

wherein said acoustic signal from said input transducer is passed through said conductive loop to said collector grid to produce enhanced frequencies.

* * * * *